United States Patent Office 3,069,391
Patented Dec. 18, 1962

3,069,391
POLYHYDROXYMETHYLENE POLYMERS
John Raymond Schaefgen, Wilmington, Del., assignor to
E. I. du Pont de Nemours and Company, Wilmington,
Del., a corporation of Delaware
No Drawing. Filed Feb. 5, 1960, Ser. No. 6,838
4 Claims. (Cl. 260—77.5)

This invention relates to shaped structures of polymeric materials derived from polyvinylene carbonate. More particularly, it relates to a process for producing shaped articles of predominantly polyhydroxymethylene or derivatives thereof.

OBJECTS

It is an object of this invention to produce shaped articles comprising high molecular weight polymeric materials derived from polyvinylene carbonate.

Another object is to produce shaped articles comprising polyhydroxymethylene.

A still further object is to produce shaped articles from derivatives of polyhydroxymethylene.

These and other objects will become apparent in the course of the following specification and claims.

STATE OF THE ART

Polyhydroxymethylene has been prepared by the hydrolysis of the homopolymer of vinylene carbonate. Newman and Addor (J. Am. Chem. Soc. 75, 1263 (1953)), described the preparation of vinylene carbonate by bubbling chlorine through ethylene carbonate, the reaction being activated by ultraviolet radiation, following which the resulting chloroethylene carbonate is dehydrochlorinated in the presence of an acid acceptor as, e.g., a tertiary amine. A second method of preparation employs an initial chlorination activated by ultraviolet radiation in a refluxing solution of ethylene carbonate in carbon tetrachloride, followed by dehydrochlorination as described above. The polymerization of the pure monomer may be initiated by benzoyl peroxide, and polyvinylene carbonate is describedf as a clear, colorless solid. The shaping of the polyvinylene carbonate may be accomplished by generally recognized procedures. After preparation by bulk polymerization, solution polymerization, emulsion polymerization, or other applicable processes, the reaction being initiated by any suitable free-radical-liberating material, the polymer is shaped into film by casting from solution from one of several solvents, including dimethylformamide and dimethyl sulfoxide or formed into fibers by wet- or dry-spinning techniques, by plasticized melt-spinning, or by other methods. Wet-spinning may be accomplished, for example, by extruding a solution of the polymer in dimethylformamide into methanol-water mixtures. Polyvinylene carbonate may be dry-spun from a solution in dimethylformamide or from solution in dimethyl sulfoxide.

Newman and Addor further suggest the hydrolysis of the polymer to form polyhydroxymethylene, which latter compound has been more fully described in later publications: Smets and Hayashi, J. Polymer Sci. 27, 281 (1958); Haas and Schuler, J. Polymer Sci. 31, 237 (1958); and Unruh and Smith, J. Org. Chem. 23, 625 (1958). Each of these publications describes the hydrolysis in aqueous solution. The polymer is initially solubilized, but as the hydrolysis proceeds, polyhydroxymethylene precipitates. The latter is found to be insoluble in water and in organic solvents, and thus cannot be formed directly into shaped articles.

STATEMENT OF INVENTION

In accordance with the present invention a useful shaped polymeric structure comprising no more than about 25% of a repeating unit of the formula

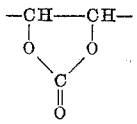

and at least about 75% of a repeating structural unit of the formula

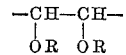

wherein —R represents the same or different members of the class consisting of a hydrogen atom and a monovalent radical, is formed by a process which comprises immersing a useful shaped structure of polyvinylene carbonate in a hydrolyzing reagent. In a preferred method a shaped structure of polyvinylene carbonate is immersed in a dilute alkaline methanol solution for periods ranging up to several days. It is found that the hydrolysis may be effected quantitatively in about 1 or 2 days if the immersed structure is maintained at a temperature of between about 50° C. and 60° C. About 3 to 5 days are necessary where the immersed structure stands at room temperature. The hydrolysis may be accelerated by the addition of small amounts of water to the methanolic solution. Metal alkoxides in alcohols, alcoholic ammonia, concentrated aqueous ammonia and other similar basic media may be employed in the hydrolysis. Fibers and films formed in this manner may be oriented by drawing to structures having good properties. In a preferred embodiment, at least about 99% of the polyvinylene carbonate is hydrolyzed to form essentially a homopolymer of polyhydroxymethylene. By a "useful shaped structure" is meant one in which no more than two dimensions are minor with reference to the third dimension.

The shaped polyhydroxymethylene structures may be treated to form derivatives such as polyacetoxymethylene, copolymers of hydroxymethylene and acetoxymethylene and in general derivatives wherein —R', as defined above, may be any structure of the class consisting of

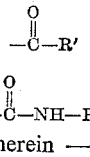

—SO$_2$—R' and —A wherein —R' is a member of the class consisting of —H and a monovalent organic radical of the class consisting of aliphatic, aromatic and aliphatic-aromatic types, and —A represents a monovalent radical derived from an oxygen-containing inorganic acid such as —NO$_2$ and —SO$_3$H. Since polyhydroxymethylene becomes swollen in molten urea, reactions to form its derivatives are conveniently carried out in that medium. Since the esterified polymer is soluble in the reaction medium, following isolation it may be shaped by spinning or casting from solution by standard procedures. Among suitable reagents for treating polyhydroxymethylene are acetic anhydride, trifluoroacetic acid, trifluoroacetic anhydride, and other similar simple monobasic carboxylic acids or their anhydrides, chlorides, or other reactive derivatives. Sulfonic acids, as benzenesulfonic acid and other simple compounds of the type, may be utilized in the formation of suitable derivatives. Isocyanates, by reaction with polyhydroxymethylene, form urethane derivatives. Inorganic orygen-containing acids, as sulfuric acid and nitric acid, may be reacted with polyhydroxymethylene, and ethers may be prepared by treatment with simple alcohols under recognized ether-forming conditions. Ammonia and primary or secondary amines react with the non-hydrolyzed polyvinylene carbonate to yield a polymer having both hydroxyl and urethane units.

The following examples are cited to illustrate the invention. They are not intended to limit it in any way. Inherent viscosities have been determined in accordance with the following equation:

$$\eta_{inh} = \frac{\ln \eta_{rel}}{c}$$

The relative viscosity ($\eta_{rel}$) may be determined by dividing the flow time in a capillary viscometer of a dilute solution of the polymer by the flow time for the pure solvent. The concentration ($c$) is in accordance with the usual practice 0.5 gram of polymer per 100 ml. of solution, and the measurements are made at a temperature of 30° C.

*Example 1*

Ethylene carbonate, in the amount of 500 grams, is placed in a reaction vessel with 1000 cc. of carbon tetrachloride. An ultra-violet lamp in a quartz jacket is immersed in the solution, and the mixture is heated to the point of reflux. Chlorine gas is added rapidly to the refluxing reaction mixture. The course of the reaction may be followed by the observation of two "clear" points, the first occurring when the refractive indices of the two phases are the same, and the second when the mixture becomes homogeneous. Following the appearance of the second "clear" point, the addition of chlorine is continued until a total of about 600 grams has been removed from the chlorine tank. The solvent is removed by distillation, and the product distilled under vacuum. The resulting chloroethylene carbonate may be dehydrochlorinated by treatment with a refluxing solution of triethylamine in diethyl ether. Following overnight reaction, the solids are removed and washed with ether, and the combined solutions are evaporated to remove ether. Distillation of the residue yields vinylene carbonate, which is purified by reduced pressure reflux treatment with 1-2% sodium borohydride, followed by distillation. The purified monomer is then polymerized by the Newman and Addor technique described above to form polyvinylene carbonate.

A thin film of polyvinylene carbonate, whose inherent viscosity in dimethylformamide is 2.42, is totally converted to polyhydroxymethylene by soaking in a 1M sodium methoxide solution in methanol for 5 days at room temperature. The form imparted to the polyvinylene carbonate is retained and a film of polyhydroxymethylene results. The product is tough, and may be creased repeatedly. Its water absorption is 38%, and the wet film may be drawn to 8 times its original length at a temperature of 200° C. on a hot pin, yielding a crystalline, oriented material. Infrared analysis reveals that fewer than 1% of the carbonyl groups remain in the hydrolyzed film, and strong absorption characteristic of hydroxyl groups is noted. The film exhibits a tenacity/elongation/modulus ratio of 6.5/4.5/309.

A second sample of polyhydroxymethylene of similar properties is prepared by immersing polyvinylene carbonate in the same hydrolyzing reagent for 2 days at a temperature of 50° C. to 55° C.

*Example 2*

The gum which results on polymerization of vinylene carbonate, and which contains polyvinylene carbonate and unreacted monomer, is converted to a spinning dope containing 20% solids in dimethyl sulfoxide. This dope may be dry-spun to yield fibers of polyvinylene carbonate, which are drawn 3-4× in warm water to yield moderately strong oriented fibers, having an inherent viscosity of 1.48, and a tenacity/elogation/modulus ratio of 1.9/35/42. This fiber (undrawn) is converted to polyhydroxymethylene by soaking in a one molar solution of sodium methoxide in methanol for a period of 5 days at room temperature. The fiber of polyhydroxymethylene, which has retained the shape imparted to the polyvinylene carbonate, is drawn 3.5× in water at 60° C., and is then heat-set while taut at a temperature of 200° C. for two minutes. The product exhibits a tenacity/elongation/modulus ratio of 5/10/120.

*Example 3*

A 3 mg. sample of polyhydroxymethylene film is swollen in 0.1 gram of urea containing about 5% anhydrous sodium acetate as a catalyst at a temperature of 140° C. Acetic anhydride, in the amount of 0.3 cc., is added. The swollen film is quickly esterified, acetic acid is distilled from the reaction mixture, and a clear, colorless, viscous solution results. After 10 minutes, the reaction mixture is poured into water, heated to a temperature of 70° C. to dissolve the by-product, N-acetylurea, and filtered. The resulting polyacetoxymethylene is soluble in acetone and dimethylformamide and swollen by water. Infrared analysis confirms the absence of characteristic hydroxyl absorption and the presence of the expected carbonyl band. An oriented product may be produced by drawing the film to 4.8 times its original length, at a temperature of 200° C. on a hot pin.

*Example 4*

A small sample of a film of polyhydroxymethylene is placed in a tube with urea, as in Example 2, and an excess of trifluoroacetic anhydride is added. The tube is alternately flushed with nitrogen and evacuated to remove traces of air, and is finally evacuated and sealed. After heating to a temperature of 140° C. for one hour, the tube is cooled and opened, and the contents removed. The product is a partially esterified polyhydroxymethylene, 50% of the hydroxyl groups having been converted to trifluoroacetoxy groups.

*Example 5*

A 3 milligram sample of polyvinylene carbonate film is placed in a solution of ammonia in methanol. After standing for three days, the film is found to have retained its shape and remained clear. Infrared analysis indicates that 10 to 20% of the carbonate linkages have not been affected, but, by strong urethane and hydroxyl peaks, the polymer is shown to contain both urethane and hydroxyl groups.

PURIFICATION OF VINYLENE CARBONATE

Vinylene carbonate, as it is generally prepared, may provide serious difficulties with respect to its polymerization. The monomer must frequently be repeatedly purified by distillation in order to produce a polymerizable product. This procedure is tedious and time-consuming, and results in the loss of a large percentage of the monomer. However, the monomer may be purified to a polymerizable condition by refluxing with sodium borohydride, and distilling. Thus, upon refluxing the crude vinylene carbonate with sodium borohydride at about 35 mm. pressure (at which the monomer exhibits a boiling point of about 75° C.) for one hour and distilling the mixture without fractionation, a polymerizable product results. The loss of monomer by this procedure is only about 10%. Monomer treated in this manner a second time may be stored for a number of days at room temperature without protection from light; untreated monomer discolors rapidly under these conditions. Vinylene carbonate purified by this process may be polymerized readily, yielding polyvinylene carbonate having an inherent viscosity of as high as 3.86, as measured in dimethylformamide. It is to be noted that the sodium borohydride purification method described above is more effective with monomeric material whose precursor was prepared by chlorination of ethylene carbonate in carbon tetrachloride solution than with vinylene carbonate whose precursor was prepared by chlorination in bulk without solvent.

Because of the insolubility of polyhydroxymethylene and its infusible nature, it is not possible to form it into shaped articles by conventional methods for synthetic polymers. These same properties, however, contribute to the utility of structures comprising polyhydroxymethylene, and make them especially valuable. In the form of films, polyhydroxymethylene may, for example, find utility as a resistant covering for protection from atmospheres, or as a liner for drums, cartons, etc. Fibers of the polymer may be woven into fabrics which serve useful purposes in various textile industrial applications. Such fabrics may be used as filter media, conveyor belts and for other purposes which require inert materials. Shaped structures of polyhydroxymethylene may be nitrated, and may find utility as solid propellants. Films and fibers of esterified or partially esterified polyhydroxymethylene may be used for many industrial and textile uses. Films may serve many wrapping and protective functions, and fibers may be woven into fabrics which find utility in many end-use applications.

Many equivalent modifications will be apparent to those skilled in the art from a reading of the above without a departure from the inventive concept.

What is claimed is:

1. A method for making filaments comprising extruding polyvinylene carbonate through an orifice to obtain a filament, and immersing said filament in a hydrolyzing agent until there results a polymer whose structural formula contains at least about 75% of the repeating unit

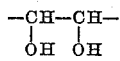

while maintaining the filament in its dimensional shape as extruded.

2. The process of claim 1 followed by esterification of at least a portion of the hydroxyl groups in the polymeric structure with acetic anhydride.

3. The process of claim 1 followed by esterification of at least a portion of the hydroxyl groups of the polymeric structure with trifluoroacetic anhydride.

4. A method for making films comprising extruding polyvinylene carbonate through an orifice to obtain a film, and immersing said film in a hydrolyzing agent until there results a polymer whose structural formula contains at least about 75% of the repeating unit

while maintaining the film in its dimensional shape as extruded.

References Cited in the file of this patent

UNITED STATES PATENTS

| | | |
|---|---|---|
| 2,700,035 | Bristol | Jan. 18, 1955 |
| 2,847,402 | Gluesenkamp et al. | Aug. 12, 1958 |
| 2,930,779 | Drechsel | Mar. 29, 1960 |
| 2,936,488 | Cottet et al. | May 17, 1960 |

OTHER REFERENCES

Newman et al.: J. Am. Chem. Soc. 75, 1263 (1953).
Hayashi et al.: J. Polymer Sci. 27, 281 (1958).
Haas et al.: J. Polymer Sci. 31, 237 (1958).
Unruh et al.: J. Org. Chem. 23, 265 (1958).